(12) United States Patent
Sidorin et al.

(10) Patent No.: US 6,567,589 B2
(45) Date of Patent: May 20, 2003

(54) INTEGRATED-OPTIC OUT-COUPLER DEVICE AND METHOD FOR MAKING AND USING THE SAME

(75) Inventors: Yakov Sidorin, Mountain View, CA (US); Tong Xie, Santa Clara, CA (US); Ralph Henry Page, Castro Valley, CA (US); Falgun Patel, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/970,344

(22) Filed: Oct. 3, 2001

(65) Prior Publication Data

US 2003/0063856 A1 Apr. 3, 2003

(51) Int. Cl.[7] .................................................. G02B 6/34

(52) U.S. Cl. ................................. 385/37; 385/2; 385/8; 385/10

(58) Field of Search ........................... 385/37, 14, 132, 385/142, 130, 1–11; 372/6, 39

(56) References Cited

U.S. PATENT DOCUMENTS 6,052,497 A * 4/2000 Graebner ........................ 385/7
6,381,392 B1 * 4/2002 Hayden et al. ............. 385/132

\* cited by examiner

Primary Examiner—Phan T. H. Palmer

(57) ABSTRACT

An integrated-optic device comprising a photorefractive substrate, an optical waveguide channel and at least one diffractive Bragg grating integrated in the substrate and intersecting the optical waveguide channel. The diffractive Bragg grating(s) causes at least a fraction of light coupled into the optical waveguide channel to be coupled out of the optical waveguide channel.

29 Claims, 3 Drawing Sheets

INTEGRATED-OPTIC OUT-COUPLER DEVICE AND METHOD FOR MAKING AND USING THE SAME

TECHNICAL FIELD OF THE INVENTION

The present invention relates to optics, and, more particularly, to an integrated-optic out-coupler that comprises an optical waveguide, at least one diffractive Bragg grating (DBG) and a photorefractive material substrate in which the optical waveguide and DBG(s) are integrated.

BACKGROUND OF THE INVENTION

"Free-space optics" is a phrase often used to describe a technology in which three-dimensional (3-D) discrete optical components, such as prisms and lenses, are used to operate on light in a particular manner for a particular purpose. These discrete optical components are often combined in a particular configuration to operate on light in a particular manner to produce a particular optical effect. Due to the 3-D nature of these discrete optical components, light propagates through them over distances of millimeters or centimeters and thus the configuration is referred to as being on a "macroscopic" scale. These discrete optical components are also commonly referred to as "bulk" optical components.

It is known to create macroscopic optical out-couplers using these bulk components. The term "optical outcoupler" in this context simply means that the device formed by the bulk component(s) receives light coupled into it and couples at least some fraction of the received light out of the device. This "out-coupling" of light can be useful for many purposes, such as, for example, filtering, attenuating, equalizing, or merely redirecting light.

Due to the ever increasing need to provide a capability for performing these types of operations on a "microscopic" scale (i.e., on the order of micrometers), integrated optical circuits have been developed that have optical elements that are integrated together in a substrate material to form an optical integrated circuit (OIC). These OICs are often referred to as "hybrid" OICs because the actual packaged OIC typically includes optical components that are not integrated, but which are included in the packaged system to enable communication with the integrated optical circuit. A fiber-to-waveguide structure is an example of a component often included in the OIC package for this purpose. Such structures are needed for a variety of reasons, such as, for example, to couple integrated optical waveguides to external optical fibers (i.e., to fibers that are external to the OIC package). In this sense, the OICs are viewed as not being fully integrated and are therefore referred to at times as hybrid ICs.

In these types of OICs, 3-D integrated optical configurations can be built by combining, or "stacking", material layers that have two-dimensional (2-D) integrated optical sub-systems. To provide the optical connection between these stacked layers, optical out-couplers can be used. One of the current disadvantages of OICs is associated with the difficulties of fabrication and packaging. For example, corrugated surfaces formed in one or more of the layers (such as relief surface structures) present difficulties when bonding 2D-layers together. Since the packaging of the OIC can represent a large percentage of the overall costs associated with producing the IC, it is desirable to reduce the difficulties associated with packaging, which generally translates into reduced packaging costs.

Accordingly, a need exists for fully-integrated-optic device that is capable of operating on light on a microscopic scale and that can be created without having to combine material layers having 2-D elements formed therein to obtain 3-D optical configurations. By enabling a fully-integrated-optic device to be created without having to combine material layers, the aforementioned difficulties and high costs associated with creating and packaging OICs can be avoided.

SUMMARY OF THE INVENTION

The present invention provides an integrated-optic out-coupler device that comprises a photorefractive substrate, an optical waveguide channel and at least one diffractive Bragg grating. The optical waveguide channel and at least one diffractive Bragg grating are integrated in the substrate. The diffractive Bragg grating intersects the optical waveguide channel and causes at least a fraction of light propagating along the optical waveguide channel to be coupled out of the waveguide.

The present invention also provides a method of out-coupling light out of the plane of the optical waveguide. The method comprises the steps of providing an integrated-optic out-coupler device, coupling light into an optical waveguide channel formed in a photorefractive substrate of the integrated-optic waveguide device and operating on the light propagating along the optical waveguide channel with at least one DBG that has been formed in the substrate to cause at least a fraction of the light to be coupled out of the optical waveguide channel.

The present invention also provides a method for creating an integrated-optic device. The method comprises the steps of providing a photorefractive substrate, forming at least one optical waveguide channel in the substrate and forming at least one diffractive Bragg grating in the substrate such that said at least one diffractive Bragg grating intersects said at least one optical waveguide channel.

In contrast to the known "hybrid" OICs, the present invention provides a fully-integrated-optic device that is capable of operating on light on a microscopic scale and that can be created without having to combine material layers having 2-D elements formed therein to obtain 3-D optical configurations. By enabling a fully-integrated-optic device to be created without having to combine material layers, the aforementioned difficulties and high costs associated with creating and packaging OICs can be avoided.

Furthermore, another advantage of using a photorefractive substrate is that it makes the integrated-optic device re-writable, which means that it is re-programmable. In other words, a holographically-defined DBG that has been written into the substrate can be erased from the substrate and a new holographically-defined DBG can be written into the substrate. This feature of the present invention enables the integrated-optic device to be re-programmed so that the manner in which it operates on light, as well as the wavelength(s) of light on which it operates, can be altered. Therefore, the integrated-optic device can be programmed and re-programmed to serve different purposes, which reduces or eliminates the need to replace the device.

These and other features and advantages of the present invention will become apparent from the following description, drawings and claims.

DETAILED DESCRIPTION OF THE INVENTION

Figure 1:
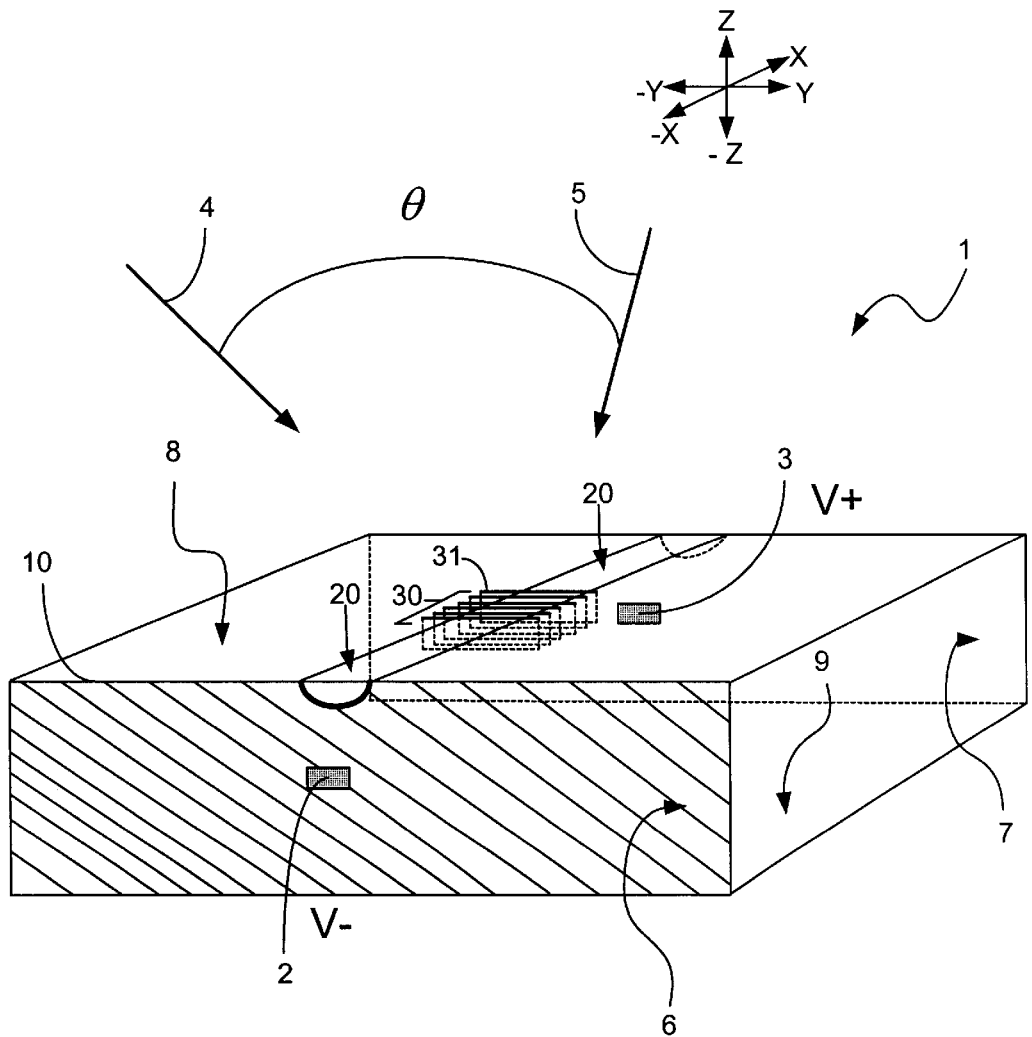
FIG. 1 is a perspective view of the integrated-optic device of the present invention that illustrates a holographically-defined DBG being written into a substrate of the device to intersect an optical waveguide channel integrated with the substrate.

In accordance with the present invention, one or more diffractive Bragg gratings (DBGs) are formed in a substrate that is photorefractive. In accordance with the present invention, it has been determined that the known process of creating volume holograms in bulk photorefractive materials can be used to form a holographically-defined DBG in a substrate material having an optical waveguide (WG) channel integrated in the substrate material to produce an integrated-optic out-coupler. The present invention utilizes this bulk holographic technology in conjunction with integrated-optics technology to form a fully-integrated optical out-coupler device.

Bulk, or volume, holograms have been used for various purposes, including, for example, electric-field multiplexing, as described in a publication entitled "Eelectric-Field Multiplexing Of Volume Holograms In Paraelectric Crystals", by Balberg et al., *Applied Optics*, Vol. 37, No. 5, Feb. 10, 1998, which is incorporated herein by reference in its entirety. Other publications that discuss various aspects of volume holograms, such as their use in optical switching and storage efficiency, include, respectively, "Free-Space Optical Cross-Connect Switch By Use Of Electroholography", *Applied Optics*, Vol. 39, No. 5, Feb. 10, 2000, by Pesach et al., and "Investigation of the Holographic Storage Capacity Of Paraelectric $K_{1-x}Li_xTa_{1-y}Nb_y O_3$:Cu, V", *Optics Letters*, Vol. 23, No. 8, Apr. 15, 1998, by Pesach et al., which are incorporated herein by reference in their entireties.

The technique used for forming a DBG in a photorefractive bulk material is generally as follows. A beam of high intensity light distribution and a beam of low intensity light distribution are brought together at a certain angle with respect to each other in the plane of the material in which the hologram is to be formed. One of the beams is known as the reference beam and the other is known as the signal beam. The combination of the beams forms an interferometric picture. When the material is exposed in this fashion, the photorefractive material reacts differently to the high and low light intensity distributions to which it is being exposed. In essence, the exposure causes the index of refraction within the material to change depending on the light intensity distribution, which results in refractive index gratings being formed in the material. This change in the optical properties of the material is preserved for some period of time, i.e., the material stores the refractive index gratings.

When the exposure is periodic (e.g., sinusoidal), the variations in the refractive index of the material will also be periodic. These refractive index modulations result in a diffractive Bragg grating (DBG) being formed in the photorefractive material. When the photorefractive material having the refractive index gratings formed therein is exposed to a beam that is phase matched to the gratings, the beam is refracted by the gratings and the volume hologram, which is stored in the material as a spatial distribution of space charge, is reconstructed. This same technique is used to form a holographically-defined DBG in a substrate having an optical WG channel formed therein to produce the integrated-optic out-coupler device of the present invention. The manner in which this is accomplished is described below with reference to FIG. 1.

The substrate material of the present invention can be any material that satisfies the criterion of being photorefractive. Preferably, the substrate is also characterized by non-zero electro-optical coefficients (i.e., it possesses electro-optical properties). The meaning of the term photorefractive generally refers to the ability of the material to locally change its refractive index in response to exposure to light. The term electro-optic is intended to denote a material property that allows the refractive index of the material to change as a result of the application of a direct current (dc) or low-frequency electric field. Materials are known which meet these requirements. For example, one material that is suitable for use as the substrate of the integrated-optic device of the present invention is $K_{1-x}Li_xTa_{1-y}Nb_y O_3$:Cu, V, which is otherwise referred to in the art as "KLTN". However, as will be understood by those skilled in the art, in view of the description provided herein, other materials that meet these requirements are also suitable for use as the substrate material. Therefore, the substrate material is not limited to any material, as long as the material is photorefractive. Substrate materials may be doped with various ions so as to allow for additional characteristics of the integrated optic device. For example, materials doped with rare-earth ions (such as $Er^{3+}$, $Yb^{3+}$) may be used for forming the integrated-optics out-coupler that possesses amplifying characteristics in the near-IR spectral region.

During operation of the device of the present invention, at least a fraction of the light propagating along the optical WG channel is caused to be coupled out of the optical WG channel by the DBG(s) upon which the light impinges. At least a fraction of the light propagating along the optical WG channel passes through the DBG(s) and continues to propagate along the optical WG channel to the output thereof. Also, a certain fraction of light in the optical WG channel may be reflected back along the waveguide channel as it impinges on the DBG(s) in a direction opposite to the direction of propagation of the light prior to the light coming into contact with the DBG(s). These operations will be discussed in detail below with reference to FIGS. 2 and 3.

In accordance with an embodiment of the present invention, the integrated-optic out-coupler device is re-writable. In other words, the holographically-defined DBG(s) can be erased and a new holographically-defined DBG(s) can be written into the substrate material. This feature of the present invention enables the integrated-optic out-coupler device to be "re-programmed" so that the manner in which it operates on light, as well as the wavelength(s) of light that it is designed to operate on, can be altered. Also, the integrated-optic out-coupler device of the present invention preferably is adjustable with respect to the manner in which it operates on light by applying a voltage differential to the DBG(s). These additional features of the present invention will be discussed below in more detail with reference to FIGS. 1–3.

FIG. 1 illustrates, by the way of example, a perspective view of an integrated-optic out-coupler device 1 of the present invention, in which a single holographic DBG 30 is defined in a substrate 10 and intersects a WG channel 20 formed in the substrate in a direction of the x-axis. Each of the blocks 31 represents a single period of the DBG 30. In accordance with an embodiment of the present invention, each DBG 30 is defined in substrate 10 in such a fashion as to provide the cross-sectional area of the DBG (as seen in the z,y-plane), to enclose the cross-section of WG channel 20 (as seen in the z,y-plane plane), and to extend significantly beyond the cross-section of the WG channel in the z,y-plane. The direction of the DBG periods 30, as seen in the x,y-plane, will generally form an arbitrary angle with the WG axis (x-axis in this example).

More than one DBG 30 may be formed in the material to create the integrated-optic out-coupler device 1, depending on the characteristics that the integrated-optic out-coupler device is expected to possess. However, at least one DBG 30 is needed in order to couple light out of the WG channel 20. A WG-mode within the phase-matching bandwidth of a given DBG 30 will be operated upon by this DBG with an efficiency that depends upon the phase mismatch between the DBG and the mode. Thus, multiple DBGs formed in the substrate 10 will generally allow for a multi-wavelength region of operation of the integrated-optic out-coupler device.

In accordance with an embodiment of the present invention shown in FIG. 1, the photorefractive substrate possesses electro-optical properties. In this example embodiment, integrated-optic out-coupler device 1 has electrodes 2 and 3 formed in the substrate 10 that enable a voltage differential to be applied across the DBG(s) 30. This differential voltage alters the manner in which the DBG(s) 30 operates on light. By the way of example, the embodiment of FIG. 1 shows the two electrodes 2 and 3 that are located on surfaces 6 and 7, of the substrate 10. It should be noted that the present invention is not limited with respect to the location, shape and size of the electrodes and the techniques used to create them. The electrodes may be, for example, placed on surfaces of the substrate 10, as shown in FIG. 1, or, alternatively, connected by conductive elements (not shown) directly to the DBG(s) 30. In the former case, the electrodes may be vapor deposited on surfaces of the substrate. In the latter case, the electrodes may be comprised as conductive traces formed in the substrate 10 that connect directly to the DBG(s) 30 with ends disposed to be electrically coupled to a voltage supply. The area of the electrodes (in z, y-plane) should be at least as large as that of the corresponding DBG 30, so as to provide an electric field distribution that influences the performance of the DBG in an optimal fashion. Electrodes having cross-sectional areas smaller than this may not produce optimum out-coupling effects.

By way of example, an integrated-optic out-coupler device 1 in accordance with the present invention is formed by the following method. The optical WG channel 20 is formed in the substrate 10 by using known integrated-optic techniques that include (but are not limited to) ion-exchange, diffusion, etching, sputtering and other methods. Formation of the electrodes 2 and 3 will require technological methods that are consistent with the position and shape of the electrodes. These techniques may range from various metal deposition techniques such as, for example, e-beam evaporation (for electrodes positioned on surfaces of the substrate 10), to combination of those techniques with known etching techniques such as, for example, an ion-beam milling or reactive-ion etching (when electrodes are to be formed in the trenches within the body of the substrate 10) technique.

In order to create the DBG(s) 30 in the substrate 10, the device 1 is exposed to an interference picture (see FIG. 1) that is formed by bringing two beams 4 and 5 together at a particular angle, θ, in the plane of the substrate 10. As a result of the photorefractive characteristic of the substrate material, the index of refraction of the substrate 10 will vary and will be higher where the light intensity distribution exposure is higher, and vice versa. Since the exposure of the substrate 10 is periodically varying in intensity due to the nature of the interference between the two beams 4 and 5, the changes in the indices of refraction of the material comprising the substrate 10, which are represented by blocks 31, will also vary periodically.

It should be noted that the order in which the WG channel 20, the electrodes 2 and 3 and the DBG(s) 30 are produced is not limited to any particular order. For example, the electrodes 2 and 3 may be created before or after the holographically-defined DBG(s) 30 has been created. As another example, the WG channel 20 may be formed after the electrodes 2 and 3 have been formed.

The DBG(s) 30 formed in the substrate 10 will be preserved for at least some period of time (i.e., the substrate 10 stores the DBG(s)). The DBG(s) 30 can be erased by, for example, uniformly exposing the substrate 10 to light at a particular wavelength (e.g., ultraviolet light) and/or by subjecting the substrate 10 to elevated temperatures. Materials are known that are capable of preserving a DBG for some period of time, or until the DBG is erased, and that are capable of being re-written with a new DBG. Preferably, the material comprising the substrate 10 allows information that is holographically stored in the substrate to be erased and new information to be written into the substrate. Although this is not a requirement of the present invention, it is beneficial to use a material that is capable of being re-written, because doing so enables the integrated-optic out-coupler device to be programmed and re-programmed to be effective for different wavelengths of light. However, even an integrated-optic out-coupler device that cannot be re-programmed by re-writing a new DBG to it is useful for the wavelength or bandwidth of light for which it was originally created. The re-writability of the substrate 10 merely adds further advantages to the present invention by providing the integrated-optic out-coupler device 1 with greater versatility and flexibility.

Figure 2:
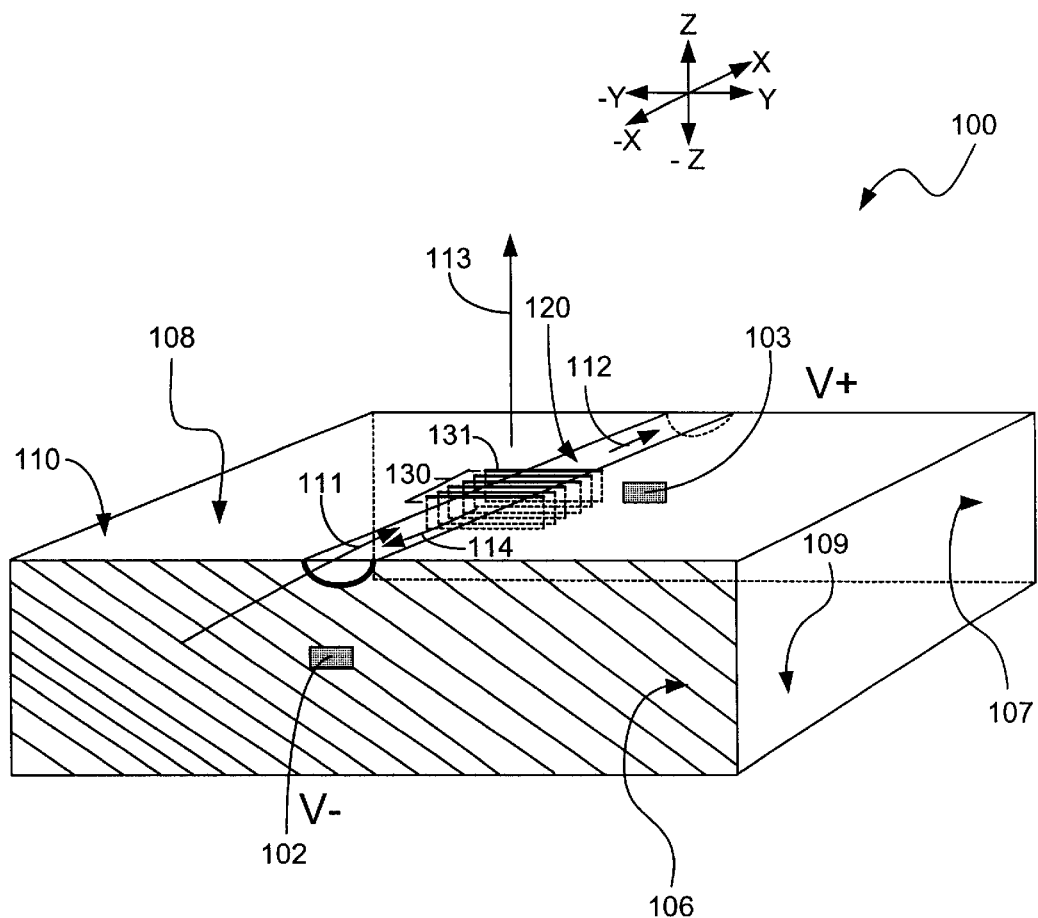
FIG. 2 is a perspective view of the integrated-optic device of the present invention shown in FIG. 1 that illustrates a first example of the manner in which light coupled into the optical waveguide channel is coupled out of the optical waveguide channel.
Figure 3:
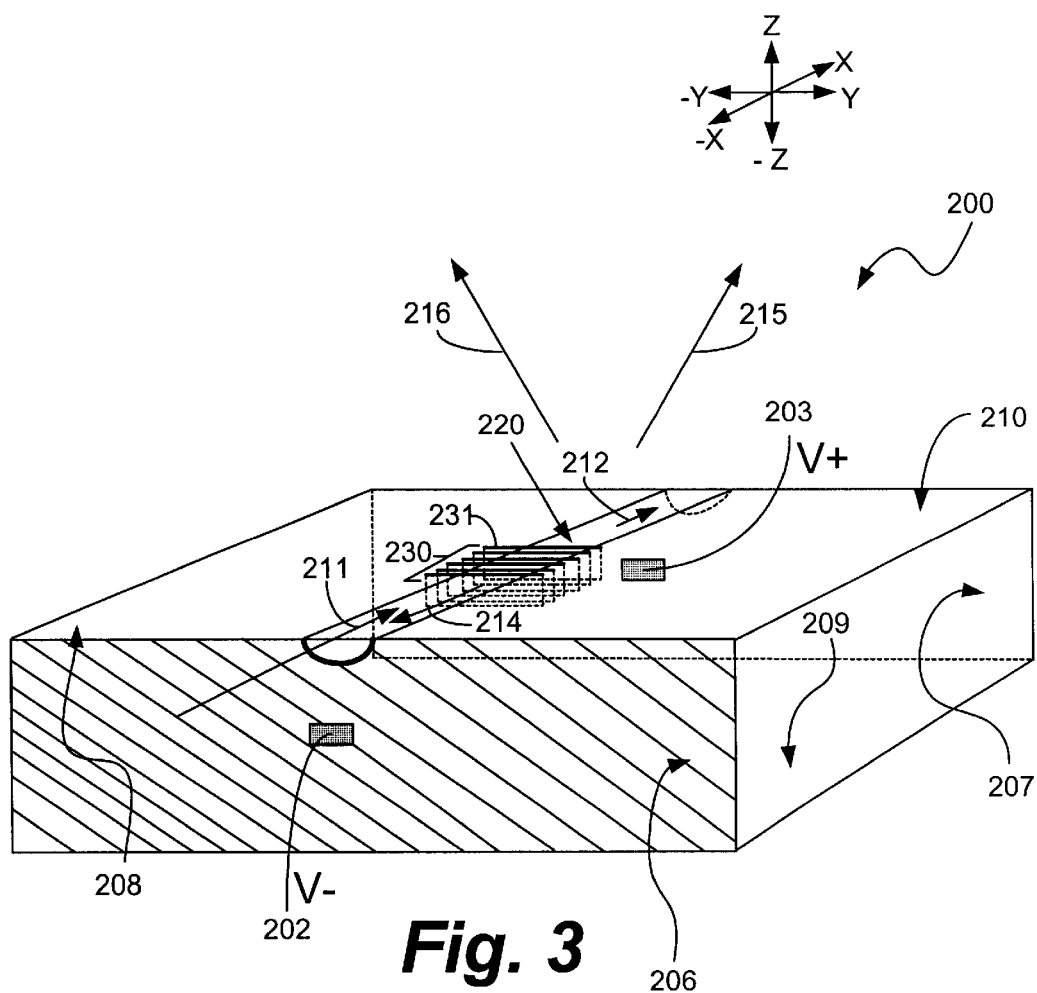
FIG. 3 is a perspective view of the integrated-optic device of the present invention shown in FIG. 1 that illustrates a second example of the manner in which light coupled into the optical waveguide channel is coupled out of the optical waveguide channel.

FIGS. 2 and 3 illustrate perspective views of the integrated-optic out-coupler device and demonstrate examples of the fashion in which the fraction of light coupled out by the device can be altered in accordance with the configuration of the device. FIG. 2 shows an example of the integrated-optic device 100 where the DBG(s) 130 couples a fraction of light out of the optical WG channel 120 in a direction normal to the surface 108 of the substrate 110, as represented by arrow 113. The light propagating along the optical WG channel 120 is represented by arrow 111. The fraction of light in the WG channel 120 that passes through the DBG(s) 130 without being out-coupled is represented by arrow 112. Generally, a certain fraction of the light coupled into the WG channel 120 is also retro-reflected (i.e., optically fed back) by the DBG(s) along the WG channel 120 in the −x direction, as shown by arrow 114.

The direction of light coupled out of the WG channel 120 by the DBG(s) 130 depends on a variety of parameters and conditions, including (1) the order of the grating, (2) the distribution of refraction indices associated with the DBG(s) 130, with the WG channel 120 and with the substrate 110, (3) the effective refractive index of the WG mode under consideration, and (4) the wavelength of the light coupled into a the optical WG channel 120. The direction of the fraction of light that is diffracted by the DBG(s) 130 is governed by:

$$\sin\theta_d \approx \left(\frac{2M}{p} - 1\right), \quad \text{(Equation 1)}$$

where an integer $$p = \frac{2\Lambda}{\lambda}$$

defines the grating order, $\lambda$ is the effective wavelength of the waveguide mode. $\Lambda$ is the grating period and M represents the order of diffraction.

If the order of the grating is p=1, the light coupled into the WG channel 120 will be partially transmitted through the DBG(s) (+x direction) and partially reflected back along the waveguide (−x direction). In accordance with the present invention, the DBG(s) 130 has an order greater than 1, which means that a fraction of light coupled into the WG channel 120 will be coupled out of the WG channel 120. If the DBG(s) 130 is of the second order, p=2, the light is coupled out of the WG channel 120 by the DBG(s) 130 in a direction normal to the surface 108 of the substrate 110, as shown in FIG. 2. This result follows from Equation 1.

The direction of out-coupling of light is practically independent of whether or not a voltage is applied to the device 100. Applying a voltage diferential across electrodes 202 and 203 affects the magnitude of the fraction of light coupled out of the WG channel 120, and thus changes the relationship between the light 112 transmitted through the grating and that reflected by it toward the input of the WG channel 120, as indicated by arrow 114.

FIG. 3 demonstrates an example embodiment of the integrated-optic device 200 of the present invention in which the DBG(s) 230 transmits a fraction of the light coupled into the WG channel 220 and couples a fraction of the light out of the WG channel 220 in multiple directions, as indicated by arrows 215 and 216, with respect the plane of the surface 208 of the substrate 210. In this example, the DBG(s) 230 is of the third order. As will be understood by those skilled in the art, the DBG order is dependent on, and relative to, the wavelength of light. Therefore, the DBG(s) may be of different orders for different wavelengths of light and thus may generally produce different out-coupling results for different wavelengths of light. The influence of the applied voltage on the performance of the out-coupler having the third order DBG 230 is analogous to that of the out-coupler device depicted in FIG. 2 and discussed above in detail.

FIGS. 2 and 3 are merely examples of the manners in which the integrated-optic out-coupler device of the present invention is capable of out-coupling light. Those skilled in the art will understand, in view of the discussion provided herein, that the integrated-optic out-coupler device of the present invention can be potentially constructed and/or modulated in a number of ways to out-couple light in a variety of directions at various energy levels. Therefore, the present invention is not limited with respect to the manner in which the integrated-optic out-coupler device operates on light. More particularly, the integrated-optic out-coupler device of the present invention is also not limited with respect to the direction at which light is out-coupled by the DBG(s) or with respect to the fraction of light passed, retro-reflected, and/or out-coupled by the DBG(s).

Multiple instances of the integrated-optic out-coupler device of the present invention described above with respect to the example embodiments can be cascaded, either in separate OICs or in a single OIC, to produce a cascaded out-coupler device. This will allow greater programmability and adjustibility of the individual out-couplers because any out-coupler could be programmed and re-programmed and the strength of its DBG(s) to be adjusted without affecting the other out-couplers. It should also be noted that the device of the present invention is fully compatible with batch, or large scale, IC fabrication technologies. Those skilled in the art will understand how the device of the present invention can be mass produced using large scale IC fabrication techniques (VLSI) in view of the discussion of the device provided herein and in view of the level of skill in the art of IC fabrication.

It should also be noted that although the DBG(s) have been described with reference to FIGS. 2 and 3 as being electrically modulated, it is also possible to use thermal or acoustical modulation to modulate the DBG(s). Those skilled in the art will understand the manner in which these other modulation techniques may be used to modulate the DBG(s) to accomplish the goals obtained through the use of electrical modulation. Also, in case where electrical modulation is not used, it is not necessary that the substrate material have electro-optical properties.

The present invention has been described with reference to certain example embodiments. However, the present invention is not limited to the embodiments described above, as will be understood by those skilled in the art from the discussion provided herein. The manner in which the integrated-optic out-coupler device functions depends on a large number of parameters, including the material used as the substrate, the wavelength of light upon which the out-coupler operates, the number and order of DBGs comprised in the out-coupler device, the manner in which the DBG(s) are formed in the substrate (e.g., the type of exposure used to create the grating(s)), the refractive indices involved, the manner in which the out-coupler device is modulated, etc. Those skilled in the art will understand the manner in which these and other parameters can be selected to create the desired out-coupling effect.

What is claimed is:

1. An integrated-optic out-coupler device comprising:
    a photorefractive substrate;
    at least one optical waveguide channel integrated with the substrate, the optical waveguide channel having an input and an output;
    at least one diffractive Bragg grating integrated with said substrate, said at least one diffractive Bragg grating intersecting said at least one optical waveguide channel, wherein at least a fraction of light coupled into said at least one optical waveguide channel is coupled out of said at least one optical waveguide channel by said at least one diffractive Bragg grating;
    a first electrode; and
    a second electrode, said first and second electrodes being configured to modulate said at least one diffractive Bragg grating when a voltage differential is created between said first and second electrodes.

2. The integrated-optic out-coupler device of claim 1, wherein the device is fully compatible with large scale integrated circuit fabrication technologies.

3. The integrated-optic out-coupler device of claim 1, wherein at least a fraction of the light coupled into the optical waveguide channel passes through said at least one diffractive Bragg grating to the output of the optical waveguide channel.

4. The integrated-optic out-coupler device of claim 1, wherein at least a fraction of the light coupled into the optical waveguide channel is retro-reflected by said at least one diffractive Bragg grating.

5. The integrated-optic out-coupler device of claim 1, wherein said at least a fraction of light coupled out of the optical waveguide channel corresponds to a single beam of light that is orthogonal to a plane of the substrate.

6. The integrated-optic out-coupler device of claim 1, wherein said at least a fraction of light coupled out of the optical waveguide channel corresponds to a plurality of light beams.

7. The integrated-optic out-coupler device of claim 1, wherein said at least a fraction of light coupled out of the optical waveguide channel corresponds to a plurality of light beams, at least one of said light beams being non-orthogonal with respect to a plane of the substrate.

8. The integrated-optic out-coupler device of claim 1, wherein said at least one diffractive Bragg grating has an order that is greater than 1.

9. The integrated-optic out-coupler device of claim 1, wherein said fraction of light coupled out of the optical waveguide channel is at least partially dependent on the differential voltage created between the electrodes.

10. The integrated-optic out-coupler device of claim 1, wherein the integrated-optic out-coupler device comprises at least two diffractive Bragg gratings formed in said substrate, each of said diffractive Bragg gratings intersecting said optical waveguide channel.

11. The integrated-optic out-coupler device of claim 1, wherein at least one diffractive Bragg grating can be erased from said substrate and one or more new diffractive Bragg gratings can be written into the substrate.

12. The integrated-optic out-coupler device of claim 1, wherein said fraction of light coupled out of the optical waveguide channel can be varied by varying the a voltage differential created between said electrodes.

13. A cascaded integrated-optic out-coupler device comprising a plurality of integrated-optic out-coupler devices, each integrated-optic out-coupler device comprising:
 a photorefractive substrate;
 at least one optical waveguide channel integrated with the substrate, said at least one optical waveguide channel having an input and an output; and
 at least one diffractive Bragg grating integrated with said substrate, said at least one diffractive Bragg grating intersecting said at least one optical waveguide channel, wherein at least a fraction of light coupled into said at least one optical waveguide channel is coupled out of said at least one optical waveguide channel by said at least one diffractive Bragg grating, and wherein each integrated-optic out-coupler device is optically coupled to at least one other of said each integrated-optic out-coupler devices to form said cascaded integrated-optic out-coupler device.

14. The cascaded integrated-optic out-coupler device of claim 13, wherein the cascaded integrated-optic out-coupler device is fully compatible with large scale integrated circuit fabrication technologies.

15. The cascaded integrated-optic out-coupler device of claim 13, wherein the cascaded integrated-optic out-coupler device is comprised in a single integrated circuit.

16. A method of out-coupling light input to an integrated-optic out-coupler device, the method comprising the steps of:
 providing an integrated-optic out-coupler device;
 coupling light into at least one optical waveguide channel formed in a substrate of the integrated-optic out-coupler device;
 operating on the light propagating along said at least one optical waveguide channel with at least one diffractive Bragg grating formed in said substrate to cause at least a fraction of the light coupled into said at least one optical waveguide channel to be coupled out of said at least one optical waveguide channel;
 providing first and second electrodes on the integrated-optic out-coupler device; and
 modulating said at least one diffractive Bragg grating by applying a voltage differential across said first and second electrodes.

17. The method of claim 16, wherein said at least one diffractive Bragg grating has an order that is greater than 1.

18. The method of claim 16, wherein at least a fraction of said light coupled into said at least one optical waveguide channel passes through said at least one diffractive Bragg grating without being coupled out of the optical waveguide channel by said at least one diffractive Bragg grating.

19. The method of the claim 16, wherein at least a fraction of the light coupled into said at least one optical waveguide channel is retro-reflected by said at least one diffractive Bragg grating.

20. The method of claim 16, wherein said substrate is photorefractive and has electro-optic properties, and wherein the diffractive Bragg grating can be erased from the substrate and a new diffractive Bragg grating can be written into the substrate.

21. The method of claim 16, wherein at least a fraction of the light coupled into said at least one optical waveguide channel passes through said at least one diffractive Bragg grating to the output of said at least one optical waveguide channel.

22. The method of the claim 16, wherein at least a fraction of the light coupled into said at least one optical waveguide channel is retro-reflected by said at least one diffractive Bragg grating.

23. The method of the claim 16, wherein said at least a fraction of light coupled out of the optical waveguide channel corresponds to a single beam of light that is orthogonal to a plane of said substrate.

24. The method of the claim 16, wherein said at least a fraction of light coupled out of said at least one optical waveguide channel corresponds to a plurality of light beams.

25. The method of the claim 16, wherein said at least a fraction of light coupled out of said at least one optical waveguide channel corresponds to a plurality of light beams, at least one of said light beams being non-orthogonal with respect to a plane of the substrate.

26. A method for creating an integrated-optic device, the method comprising the steps of:
 providing a photorefractive substrate;
 forming at least one optical waveguide channel in the substrate;
 forming at least one diffractive Bragg grating in the substrate such that said at least one diffractive Bragg grating intersects said at least one optical waveguide channel; and
 providing first and second electrodes on the integrated-optic device for applying a differential voltage across the device in order to modulate said at least one diffractive Bragg grating.

27. The method of the claim 26, wherein the material substrate is capable of being re-written by erasing said at least one diffractive Bragg grating formed in the substrate and by forming a new diffractive Bragg grating in the substrate.

28. The method of claim 26, wherein the substrate also possesses electro-optical properties.

29. The method of claim 26, wherein the material substrate is capable of being re-written by erasing said at least one diffractive Bragg grating formed in the substrate and by forming a new diffractive Bragg grating in the substrate.

* * * * *